United States Patent [19]

Balthes et al.

[11] 4,047,366
[45] Sept. 13, 1977

[54] TOBACCO TOPPING APPARATUS

[75] Inventors: John Balthes, Port Burwell; Garry Balthes, Tillsonburg; William Palmer, Straffordville, all of Canada

[73] Assignee: Balthes Farm Equipment Manufacturing Limited, Tillsonburg, Canada

[21] Appl. No.: 684,149

[22] Filed: May 7, 1976

[51] Int. Cl.² .................................. A01D 45/02
[52] U.S. Cl. .................................................. 56/63
[58] Field of Search ................. 56/63, 27.5, 56–59

[56] References Cited

U.S. PATENT DOCUMENTS

| | | | |
|---|---|---|---|
| 3,482,379 | 12/1969 | Splinter et al. | 56/63 |
| 3,596,447 | 8/1971 | Makeham | 56/63 |
| 3,695,013 | 10/1972 | Hammond | 56/63 |
| 3,701,240 | 10/1972 | Wise et al. | 56/63 |
| 3,717,982 | 2/1972 | Meiners | 56/63 |
| 3,736,731 | 6/1973 | Hansen | 56/63 |
| 3,914,923 | 10/1975 | Arends | 56/63 |

Primary Examiner—Russell R. Kinsey

[57] ABSTRACT

A tobacco topping apparatus is provided, suitable for mounting on a tobacco harvester, the tobacco topping apparatus having a housing assembly in which power operated cutting means having a substantially horizontally disposed cutting blade for topping a tobacco plant and severed flower portion clearing device are secured; the assembly having a front opening therein opening in the direction of movement of the apparatus down a row of tobacco plants, when the apparatus is used to top such row of tobacco plants, a wall formation having a discharge opening therein, the area of the wall formation in which the discharge opening is situate being determined by the direction of rotation of the cutting blade of the cutting means, a base having diverging edge portions defining guide means leading into an inlet slot opening in the leading edge of the base in the direction of movement of the apparatus when the apparatus is used to top tobacco plants, the guide means for guiding the stalk of the plant into the slot, and a deflector disposed adjacent the discharge opening in the wall formation for deflecting the flower portions discharged through the opening and deposit them between the rows of tobacco plants; power operated blower means surmounting the assembly adjacent the front opening of the hopper assembly for directing air downwardly onto the upper leaves of the tobacco plant when the apparatus is moved down the row of tobacco plants, to initiate the deflection of the leaves downwardly to expose the flowering portion prior to the base passing over the deflected leaves.

12 Claims, 6 Drawing Figures

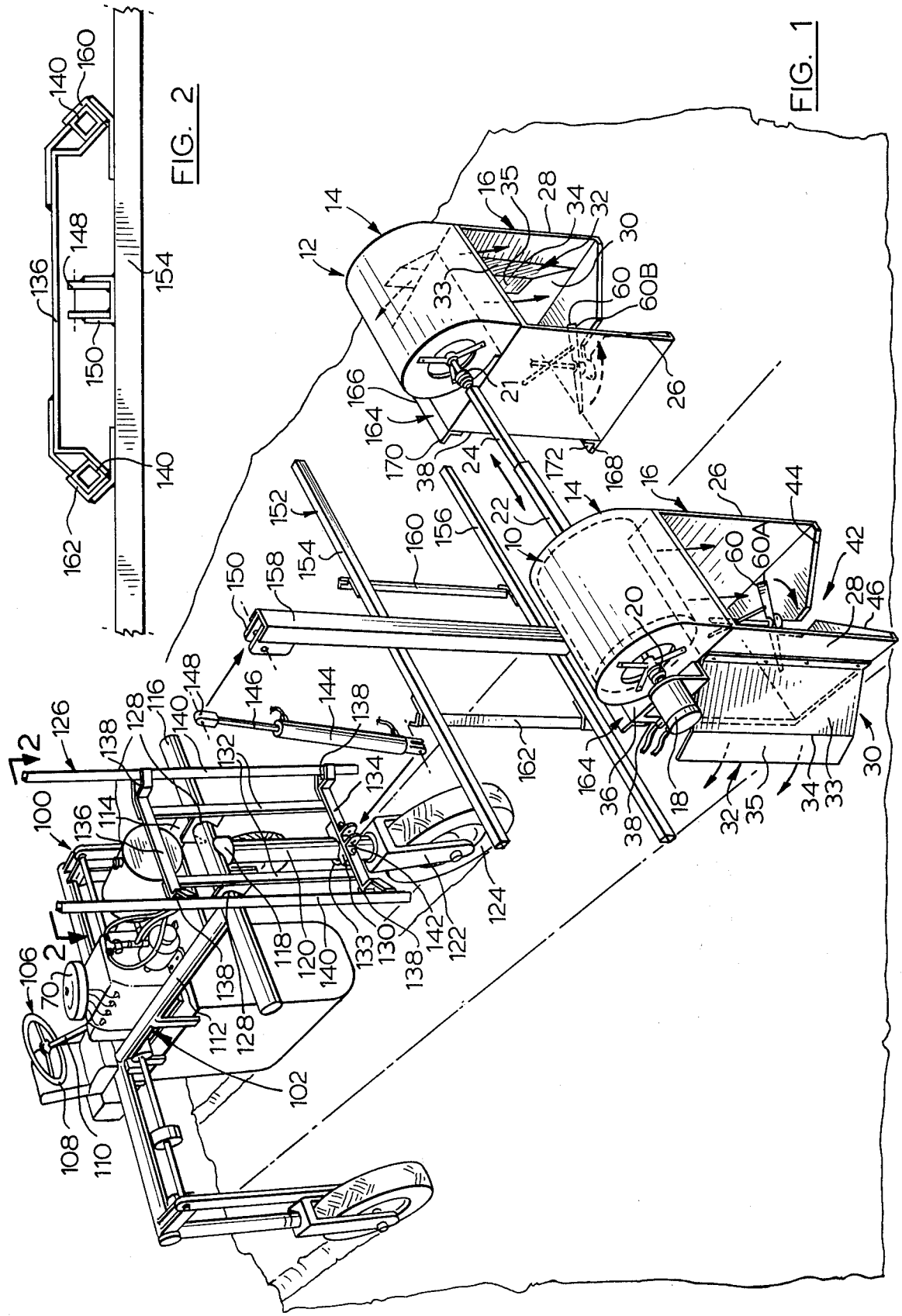

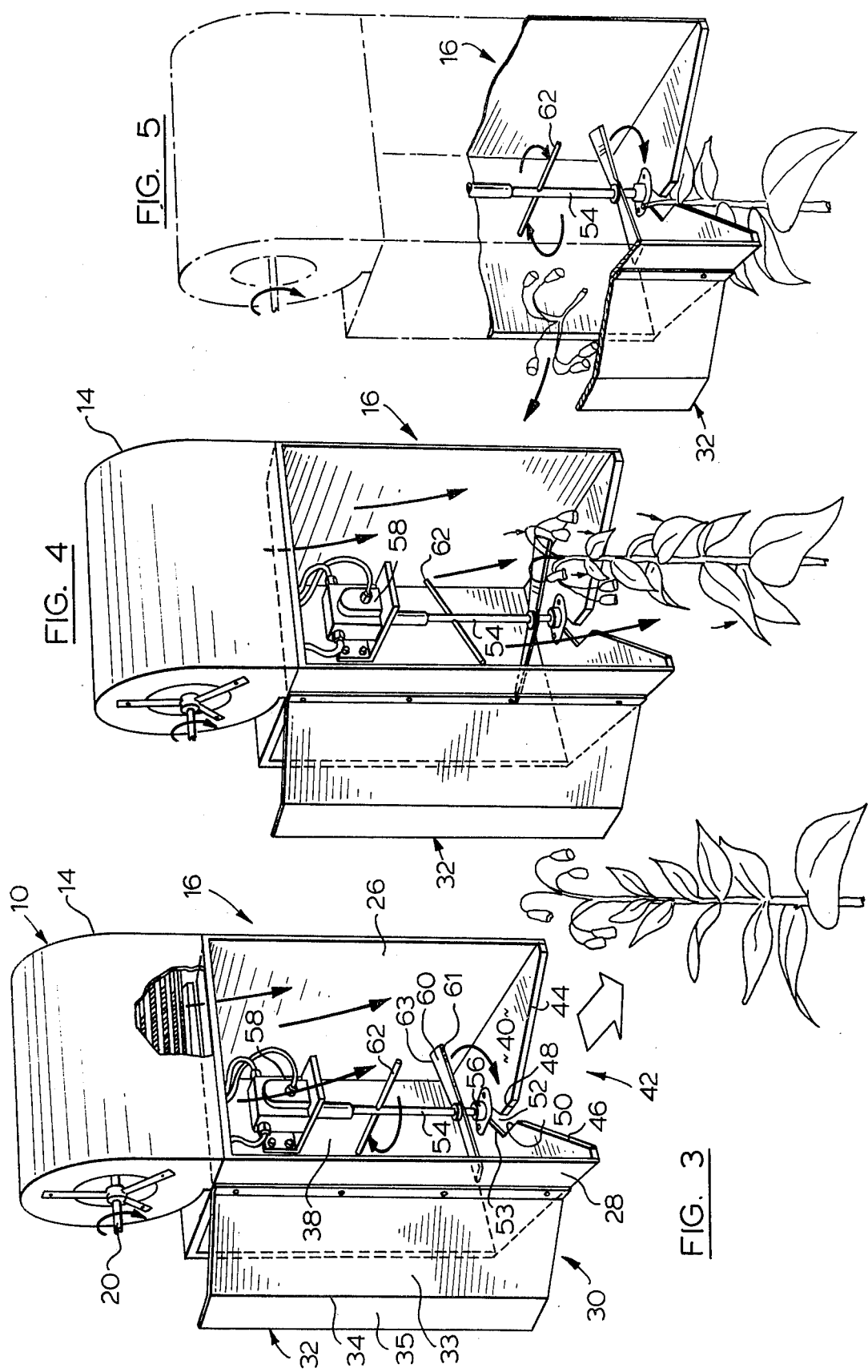

TOBACCO TOPPING APPARATUS

FIELD OF INVENTION

This invention relates to a tobacco topping apparatus.

BACKGROUND OF THE INVENTION

In order to obtain maximum yield from each tobacco plant, it is necessary to remove the flowering top portions of each plant at an appropriate time during the plant's growth period, to prevent vital nutrients necessary for the growth of the tobacco leaves from being detoured to the flowering top portions. At first, the removal of the flowering portions was accomplished by manual labour, the labourers moving down each row parting the upper leaves of each plant, and severing the flowering portions, depositing them in the openings between adjacent rows of tobacco plants. However, this method was not satisfactory, due in part to the time and cost factor, but more importantly, due to the unavailability of skilled labor in performing the topping operation.

More recently, machines and apparatus have been developed to replace the manual labor. One such machine is disclosed in U.S. Pat. No. 3,482,379 wherein a tobacco topping machine is disclosed, which pushes the top leaves down and away from the cutting mechanism, grasps the stalk firmly and passes it through a cutting mechanism thereby severing the flower portion from the plant, applies a sucker control chemical to the plant just below the cut portion, and removes the severed flowering portion of the stalk to an area between the crops rows. In U.S. Pat. No. 3,695,013 a tobacco topping apparatus is disclosed which utilizes a power operated blower for establishing a flow of air generally downwardly onto the tobacco plant, to deflect the leaves downwardly and expose the flower portion, an inclined rotating cutting blade to cut the flower portion of each plant into small particles without cutting the top leaves by virtue of the leaves having been deflected downwardly by the flow of air, and impart a motion thereto, and a peripheral wall surrounding the inclined blade to confine the movement of the small particles to a predetermined path for deposition between the rows of the tobacco plants.

However, no structure to date has provided a completely satisfactory tobacco apparatus.

While the structure of U.S. Pat. No. 3,482,379 recognizes the problems which arise from the deposition of the cut flower portions onto the plant leaves—the deposition prevents the covered portions of the plant leaves from absorbing the necessary sunshine for development resulting in discolouration and rejection for marketing purposes—still cut flower portions of the plant were deposited on the leaves due to the nature of the means used to convey the flowering portions away from the plant. Furthermore, due to the nature of the conveyors and the means used to depress the tobacco leaves, breakage of the upper leaves was not an uncommon occurrence.

Insofar as the structure disclosed in U.S. Pat. No. 3,695,013 is concerned, due to the nature of such structure, not all of the upper leaves are deflected and maintained out of contact with the cutting blade during the cutting operation. As a result, during the cutting operation, the upper leaves are cut or mangled. Furthermore, the method of cutting the flowering portion into smaller particles, disclosed in such patent, splinters the stalk of the plant, thereby damaging the plant to the extent that further growth and development of the plant is impeded.

A further difficulty arises in severing the flower portion of the tobacco plant for which no adequate provision has been made in the prior art structures. The leaves of a tobacco plant generally behave differently at various times at of the day and during different weather conditions. For example, in the morning, the leaves of the plant are usually stiffer and closer around the flowering portion, due in part to the cooler night air, then during the latter part of the day, when there is considerable sunshine and heat, with the result that the leaves tend to open away from the stalk and flower portion more, thereby exposing the flower portion more to the sunlight. As a result of the above differences, more force is necessary to deflect the leaves to expose the flower portion for cutting in the morning, than late in the afternoon on a hot day.

It is therfore, an object of this invention, to provide a tobacco topping apparatus which effectively positions the upper leaves of the plant adjacent the flower portion, out of contact with the cutting means during the cutting operation.

It is a further object of this invention to provide a tobacco topping apparatus to carry out the cutting operation, with minimal effect on the plant.

It is still a further object of this invention to provide a tobacco topping apparatus which is adjustable to permit effective use at various times of the day and during different weather conditions.

Further and other objects, features and advantages of the invention will be realized by those skilled in the art from the following summary of the invention and detailed description of a preferred embodiment thereof.

SUMMARY OF THE INVENTION

According to one aspect of the invention, a tobacco topping apparatus is provided suitable for mounting on a tobacco harvester, the tobacco topping apparatus having a housing assembly in which power operated cutting means, having a substantially horizontally disposed cutting blade for topping the tobacco plant is secured, the housing assembly having wall means defining a front opening therein, opening in the direction of movement of the apparatus down a row of tobacco plants when the apparatus is used to top the row of tobacco plants and means having a discharge opening therein, the area of the wall formation in which the discharge opening is situate being determined by the direction of rotation of the cutting blade of the cutting means used to sever the flower portion, a base having, diverging edge portions defining guide means leading into an inlet slot opening in the leading edge of the base in the direction of movement of the apparatus when the apparatus is used to top the row of tobacco plants, and, said guide means for guiding the stalk of the plant into the slot, and a deflector adjacent the discharge opening i the wall formation for deflecting the flower portions discharged through the opening and deposit them between the rows of tobacco plants; power operated blower means surmounting the hopper assembly adjacent the front opening of the hopper assembly for directing air downwardly onto the upper leaves of the tobacco plant when the apparatus is moved down the row of tobacco plants to initiate the deflection of the leaves downwardly to expose the flowering portion prior to the base passing over the deflected leaves whereby when the base passes over such leaves, it holds them down under said base during the cutting operation, out of contact with the cutting blade, the substantially horizontally disposed cutting blade being disposed for rotation over a portion of the slot for severing the salt of the tobacco plant below the flowering portion, when the stalk is guided by the guide means towards the cutting means; means to clear the severed flower portion out the opening in the wall formation, for deposition between the rows of tobacco plants; means for operating said blower means; means for operating said cutting means, and means for operating said means to clear the severed flower portion.

According to another aspect of the invention, the wall means of the apparatus may have a back wall opposed the front opening and two side walls extending forwardly from the back wall, and the opening in the wall formation being located in one of the side walls, the side wall in which this opening is located being determined by the direction of rotation of the cutting blade of the cutting means used to sever the flower portion.

According to another aspect of the invention, the slot in the base may be defined by converging side walls, converging in the direction away from the front opening towards the back wall and the converging side walls act as guide means for guiding the stalk of the plant into the slot.

Therefore, in the operation of the tobacco topping apparatus, according to the invention, as the hopper assembly is moved down a row of tobacco plants to be topped, at least the upper leaves adjacent the flower portion of each plant in turn are deflected downwardly by the blower means, to permit passage thereover by the base which deflects the leaves and holds them below the base out of contact with the cutting blade as the stalk of the plant enters and moves through the slot, and guided, controlled and supported by the edge portion of the guide means and slot, the protruding stalk portion protruding into the hopper assembly, carrying the flower portion, is engaged by the rotating blade thus severing the flower portion from the stalk, and the means to clear the flower portion engages the severed flower portion and ejects it out the side opening.

According to another aspect of the invention, the cutting means may be offset relative to the slot.

According to another aspect of the invention, the means for operating the cutting means, and means for operating the blower means may be variable to separately control the speed of rotation of the cutting blade and the force of the air directed downwardly from the blower means to initiate downward deflection of the leaves, thereby permitting adjustability of the apparatus for the various conditions of the plant.

According to another aspect of the invention, the cutting blade and means to clear the severed flower portion may be disposed on a common rotatable shaft in which event a single means to operate both may be provided, and the means to clear the flower may be offset at 90° relative to the blade on the shaft.

According to another aspect of the invention, the blade may be inclined from a lower leading stalk-engaging-edge to an upper rearward edge.

BRIEF DESCRIPTION OF THE DRAWINGS

A preferred embodiment of the invention will now be described having reference to the following drawings in which:

FIG. 1 is a partially exploded view of a tobacco topping apparatus, mounted on a tobacco harvester, according to a preferred embodiment of the invention.

FIG. 2 is a cross-section taken along the line 2—2 of FIG. 1.

FIGS. 3, 4 and 5 are close-up views of the left hand apparatus shown in FIG. 1, illustrating the cutting of one With reference to FIG. 1, there is shown two tobacco topping apparatus 10 and 12, each including power operated blowers 14, surmounting hopper assemblies 16, each blower 14 having a squirrel cage fan part of which is shown in FIG. 3 for directing air downwardly adjacent the front of each hopper assembly 16, and variable speed hydraulic motor 18 for operating both blowers 14 through coupler 2. Secured to the other side of blower 14 of apparatus 10 is tubular housing 22 secured to blower 14 of apparatus 10 by a coupler (not shown), and shaft 24 which can be telescoped into tubular housing 22 to permit the distance between the blowers 14 to be varied. At the end of shaft 24 remote from tubular housing 22 is coupler 21 causing blower 14 of apparatus 12 to operate.

Figure 6:
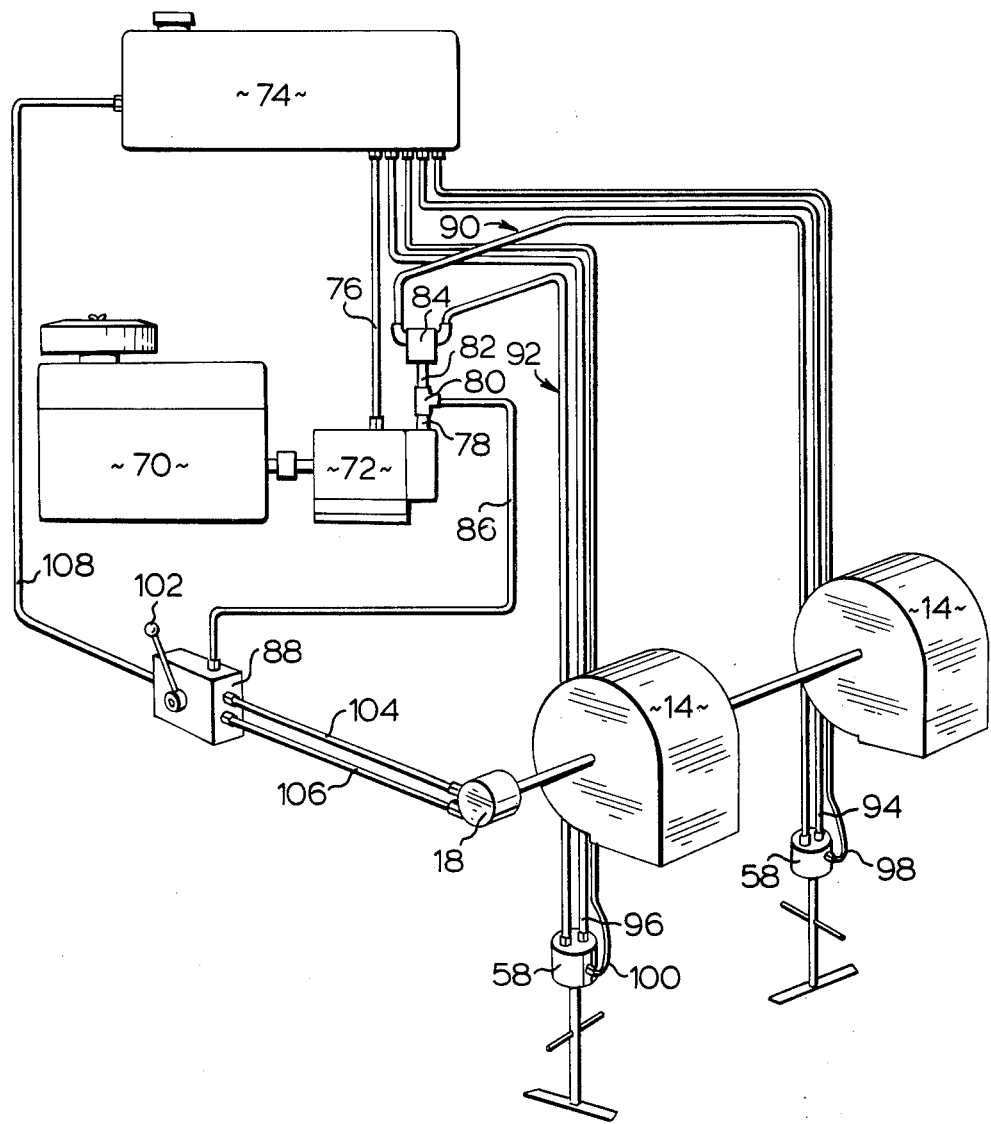

Each housing assembly 16 comprises inner side wall 26 adjacent tubular housing 22 and shaft 24, and outer side wall 28 having discharge opening 30 therein, deflector plate 32 extending rearwardly from the rear edge of wall 28, plate 32 being bent inwardly along line 34 to form portions 33 and 35.

Assembly 16 also has a top plate 36 of less length than the width of side walls 26 and 28 to provide an opening between side walls 26 and 28 for the mouth of blower 14. Assembly 16 also has a back plate 38, seen best in FIG. 3, and a base 40 having slot 42 defined by converging edge portion 44 and 46, and generally parallel edge portions 48 and 50 for purposes hereinafter described.

Adjacent that portion of the slot defined by the edge portions 48 and 50, is an offset slot portion 52 adjacent the end of which is secured flange bearing support 56 for supporting shaft 56 for rotation. Shaft 54 extends upwardly to and is rotated by hydraulic motor 58 secured to the back wall. Supported for rotation on shaft 54, is cutting blade 60 having its leading edge 61, seen best in FIG. 3, lower than its back edge 63.

Supported on shaft 54, between blade 60 and motor 58 is debris clearing bar 62, offset 90° relative to blade 60, for clearing the flower portion when severed from the stalk as hereinafter described. It should of course be understood that blade 60 and debris clearing bar 62 of tobacco topper apparatus 10 rotate in a clockwise direction looking downwardly onto the blade, whereas blade 60 and debris clearing bar 62 of tobacco topping apparatus 12 rotate in a counterclockwise direction, for the purposes of cutting the stalk and discharging the severed flower portions out discharge opening 30 for deposition between the rows of plants.

With reference to FIG. 6, a schematic of the hydraulic system used in the preferred embodiment to operate motors 18 and 58 is shown. As indicated in FIG. 6, engine 70, which forms part of the harvester to which the tobacco topping apparatus is attached, drives hydraulic pump 72 to pump hydraulic fluid, drawn from reservoir 74 through line 76, out through line 78 through Tee-connector 80 to feed line 82 leading to splitter valve 84, and to feed line 86 leading to variable speed control 88. Splitter valve 84 divides the flow of hydraulic fluid in equal portions at all times to feed lines 90 and 92, feeding hydraulic motors 58 of apparatus 12 and 10 respectively. This equal division of hydraulic fluid by splitter valve 84 ensures an equal flow of such fluid to both motors under all conditions. After passing through motors 58, the fluid returns to reservoir 74 through lines 94 and 96. Bleed lines 98 and 100 lead from each of the motors 58 to reservoir 74 for the purpose of relieving pressure on the seals in each of the motors 58.

Variable speed control 88 has lever 102 controlling the amount of fluid flowing through feed line 104 to hydraulic motor 18 for controlling the speed of the motor which in turn controls the speed of each of blowers 14. Hydraulic fluid returns to variable speed control 88 through return line 106 and back to the reservoir through return line 108 to complete the circuit.

Carrying tobacco topping apparatus 10 and 12 is harvester 100, constructed as, for example, in Canadian Letters Pat. No. 730,384 and includes frame 102, motor 70, control means 106 including steering wheel 108 and steering column 110. Frame 102 includes longitudinal frame members 112 and 114 on either side of motor 70, both secured to lateral frame member 116 supporting housing 118 at substantially the center thereof, for supporting downwardly extending leg 120 having a shaft therein for rotation to steer wheel 124. At the lower end of leg 120 is yoke 122 in which wheel 124 is supported for rotation.

Vertical frame assembly 126 is secured to harvester 100 by, hooks 128 extending rearwardly from assembly 126 secured over horizontal member 116, and mounting bracket 130 secured by U-Bolt 133 around leg 120. Hooks 128 are secured to vertical bars 132 of assembly 126, which bars 132 are secured at their upper and lower ends to horizontal bars 134 and 136 respectively, the outer ends of which being adapted to carry Y-brackets 138, for supporting vertical guide posts 140. Projecting forwardly from the lower horizontal bar 134 is clevis bracket 142 for the securing of the lower end of hydraulic cylinder 144 having piston 146 for reciprocating connector 148 by means (not shown).

Connector 148 is secured to clevis bracket 150 of cross-frame assembly 152 comprising horizontal upper strut 154 and horizontal lower strut 156 connected by vertical post 158 and vertical guide rails 160 and 162 secured to struts 154 and 156 for engaging the outer surfaces of vertical guides posts 140 for vertical reciprocation therealong by the actuation of hydraulic cylinder 144. The connection between posts 140 and guide rails 160 and 162 is best seen in FIG. 2.

Each of topper apparatus 10 and 12 is secured to the cross-frame assembly and particularly horizontal struts 154 and and 156 by box stiffener weld assemblies 164 attached to back plate 38, each of which box stiffener weld assemblies include angle iron members 166 and 168, having rearwardly projecting flanges 170 and 172 respectively, at the upper and lower ends of back plate 38, and a vertical stiffener member (not shown), joining the two members 166 and 168.

Flanges 170 and 172 of each box stiffener weld assembly 164 are secured to the upper side of horizontal strut 154 and the underside of horizontal strut 156 respectively by bolts (not shown) through holes (not shown). It is therefore apparent by the method of mounting, that the topper apparatus 10 and 12 are not only laterally adjustable relative to one another, for different row widths, but also vertically adjustable by hydraulic means for topping rows of tobacco plants of varying heights.

In the operation of each tobacco topping apparatus, the operator of harvester 100, as best he can, lines up each apparatus 10 and 12, with the tobacco plant rows to be topped, setting the distance between the two apparatus as is necessary, such distance being predetermined by the spacing of the adjacent rows of plants. The operator then adjusts each apparatus 10 and 12 at the appropriate height to top the first plant in each row and then proceeds to drive the harvester down, continually making the necessary adjustments to the height of the apparatus 10 and 12 as is necessary to top the plants at the proper height, actuating cylinder 144 each time by means adjacent his seat (not shown).

With reference to FIGS. 3, 4 and 5, as tobacco topping apparatus 10 approaches a tobacco plant to be topped, the downwardly directed air from blower 14 initiates the deflection of the leaves of the plant downwardly to expose the flower portion. Because of the structure of the hopper assembly, the downwardly directed air is also forced forwardly away from the hopper assembly 16 so that prior to the plant directly underlying the blower, the upper leaves have been deflected downwardly by the downwardly and forwardly directed air. As the harvester continues to approach the tobacco plant, converging edge portions 44 and 46 of slot 42 engage the stalk of the plant, guiding the plant stalk inwardly while at the same time the downwardly and forwardly directed air forces the leaves downwardly so that the base 40 of hopper assembly 16 passes over the leaves. As the plant is guided further into slot 42, the plant leaves are continually deflected under base 40 so that at the narrowest portion of slot 42, between side walls 48 and 50, all valuable leaves of the plant are held below base 40 and their upward movement is precluded by base 40 so that only the stalk of the plant, supporting the flower portion and non-essential growth extends upwardly of base 40 into housing assembly 16 during the cutting operation, to be engaged by blade 60 below the flower portion and non-essential growth. As blade 60 is rotated as seen in FIGS. 4 and 5, the leading inclined edge of blade 60 engages a stalk portion of the plant below the flower portion and quickly severs the flower portion from the stalk. As the flower portion begins to fall, the debris clearing bar 62 rotates into position to contact the flower portion, and discharges it through the discharge opening 30 in side wall 28 to be deflected by deflector 32 to fall to the ground between the rows. The stalk portion of the tobacco plant protruding above the side walls 48 and 50 into hopper assembly 16 subsequently enters slot portion 52 and is deflected by back wall 53 under the base 40 of hopper assembly 16.

Because the debris clearing bar 62 is rotating so quickly, as it contacts the flowering portion of the tobacco plant, it may mangle the flower portion which may then be ejected along with several smaller portions.

As may changes could be made to the invention without departing from the scope thereof, it is intended that all matter contained herein be interpreted as illustrative of the invention and not in a limiting sense.

The embodiments of the invention in which an exclusive property or privilege is claimed are as follows:

1. A tobacco topping apparatus, suitable for mounting on a tobacco harvester, said tobacco topping apparatus having a housing assembly in which power operated cutting means having a substantially horizontally disposed cutting blade for topping a tobacco plant is secured; said assembly having wall means defining a front opening therein opening in the direction of movement of the apparatus down a row of tobacco plants when the apparatus is used to top such row of tobacco plants and a discharge opening therein, the area of the wall means in which said discharge opening is situated being determined by the direction of rotation of the cutting blade of the cutting means a base having, base in the direction of movement of the apparatus when the apparatus is used to top the row of the tobacco plants, said guide means for serving to guide the stalk of the plant into the narrow slot and a deflector disposed adjacent the discharge opening in the wall means for deflecting the flower portions discharged through the opening and deposit them between the rows of tobacco plants; power operated blower means surmounting the assembly adjacent said front opening of said hopper assembly for directing air downwardly onto the upper leaves of the tobacco plant, when the apparatus is moved down the row to tobacco plants to initiate the deflection of the leaves downwardly to expose the flowering portion prior to the base passing over the deflected leaves whereby when said base passes over such leaves, it holds them down under said base during the cutting operation out of contact with said cutting blade; said substantially horizontally disposed cutting blade being disposed for rotation over a portion of said slot for severing the stalk of the tobacco plant below the flowering portion when the stalk is guided by the guide means toward the cutting means; means secured for rotation with the cutting blade to clear the severed flower portion out the discharge opening in the wall means for deposition between rows of tobacco plants; means secured to said blower means for operating said blower means; means secured to said cutting means for operating said cutting means, and means secured to said means to clear the severed flower portions for operating said means to clear the severed flower portions for operating said means to clear the severed flower portions.

2. The apparatus as claimed in claim 1, wherein the cutting means is offset relative to the narrow slot over which said cutting blade is disposed for rotation.

3. The apparatus of claim 1, wherein said means for operating, said cutting means and said means to clear the severed flower portions, constitutes a single operating means and said cutting means and means to clear the severed flower portions are disposed on a common rotatable shaft, rotatable by said single means.

4. The apparatus of claim 3, wherein said means to clear said flower portions is offset 90° relative to said cutting blade on said rotatable shaft.

5. The apparatus of claim 4, wherein the cutting blade is inclined from a lower-leading-stalk-engaging-edge to an upper rearward edge.

6. The apparatus of claim 1, wherein said means for operating said blower means is variable to vary the force of air directed downwardly to initially deflect the leaves.

7. A tobacco topping apparatus, suitable for mounting on a tobacco harvester, said tobacco topping apparatus having a housing assembly in which power operated cutting means having a substantially horizontally disposed cutting blade for topping a tobacco plant is secured; said assembly having, a front opening therein, opening in the direction of movement of the apparatus down a row of tobacco plants when the apparatus is used to top such row of tobacco plants; a back wall opposed the front opening, two side walls extending forwardly from the back wall, one of said walls having a discharge opening therein, the wall in which said discharge opening is situated being determined by the direction of rotation of the cutting blade of the cutting means, a base having a slot therein the leading portion thereof defined by converging edge portions, converging in the direction away from said front opening towards said back wall, and a deflector disposed adjacent said discharge opening for deflecting the lower portions discharged through the opening and deposit them between rows of tobacco plants; power operated blower means surmounting the assembly adjacent said front opening of said hopper assembly for directing air downwardly onto the upper leaves of the tobacco plant, when the apparatus is moved down the row of tobacco plants to initiate the deflection of the leaves downwardly to expose the flowering portion prior to the base passing over the deflected leaves, whereby when the base passes over such leaves, it holds them under said base during the cutting operation, out of contact with said cutting blade, said substantially horizontally disposed cutting blade being disposed for rotation over a portion of said slot for severing the stalk of the tobacco plant below the flowering portion, when the stalk is guided by the converging edge portions defining the leading portion slot portion, towards the cutting means; means secured for rotation with the cutting blade to clear the severed flower portion out the discharge opening in the side wall for deposition between rows of tobacco plants; means secured to said blower means for operating said blower means; means secured to said means to clear the severed flower portions for operating said cutting means, and means for operating said means to clear the severed flower portions.

8. The apparatus as claimed in claim 7, wherein the cutting means is offset relative to the slot portion over which said cutting blade is disposed for rotation.

9. The apparatus of claim 7, wherein said means for operating, said cutting means and said means to clear the severed flower portions, constitutes a single operating means and said cutting means and means to clear the severed flower portions are disposed on a common rotatable shaft, rotatable by said single means.

10. The apparatus of claim 9, wherein said means to clear said flower portions is offset 90° relative to said cutting blade on said rotatable shaft.

11. The apparatus of claim 10, wherein the cutting blade is inclined from a lower-leading-stalk-engaging-edge to an upper rearward edge.

12. The apparatus of claim 7 wherein said means for operating said blower means is variable to vary the force of air directed downwardly to initially deflect the leaves.

* * * * *